Nov. 26, 1935.　　　　　H. H. ROBBINS　　　　2,022,480
FREEWHEELING MECHANISM
Filed Oct. 15, 1930　　　　2 Sheets-Sheet 1
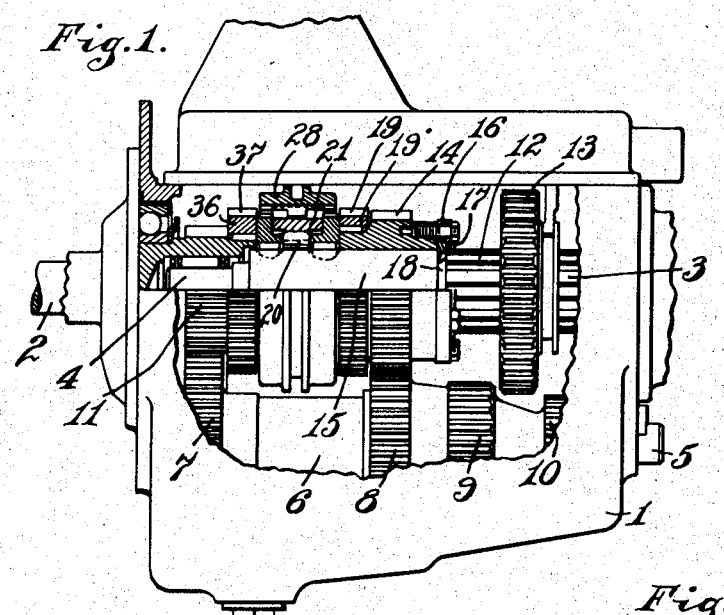
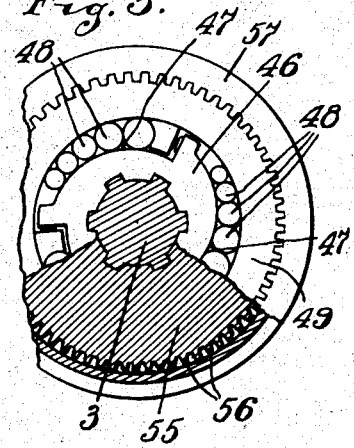
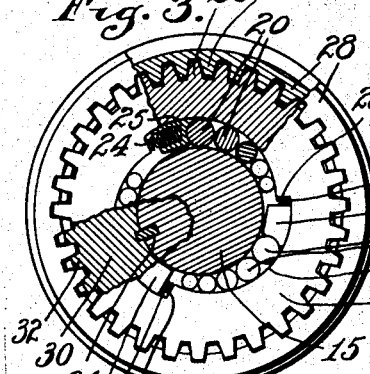
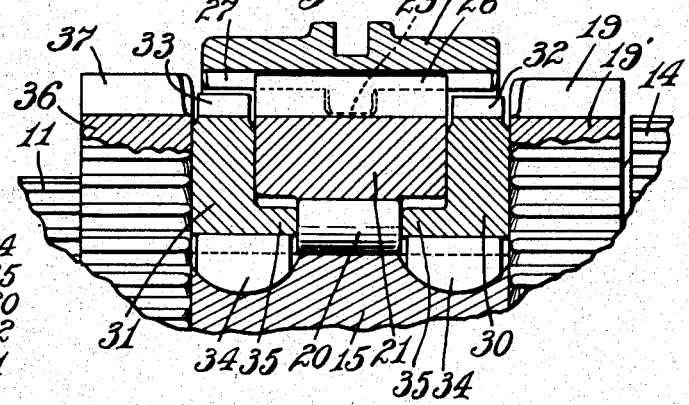
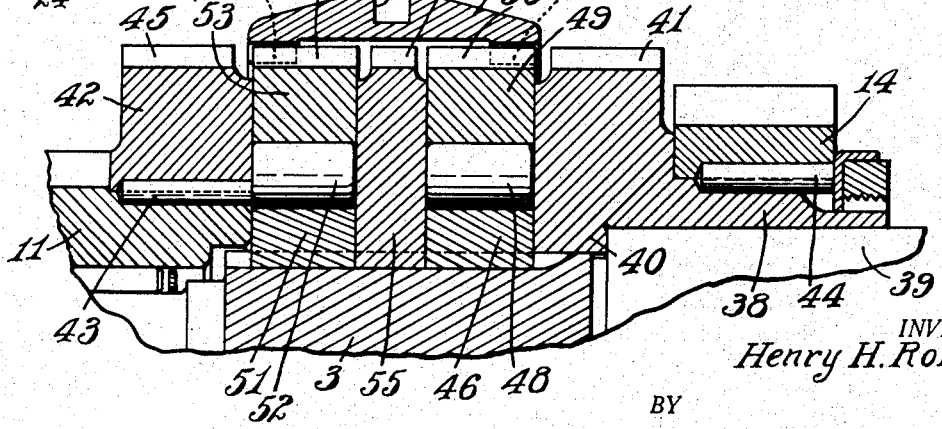
INVENTOR.
Henry H. Robbins,
BY
Hood + Hahn.
ATTORNEYS Nov. 26, 1935. H. H. ROBBINS 2,022,480
FREEWHEELING MECHANISM
Filed Oct. 15, 1930 2 Sheets-Sheet 2
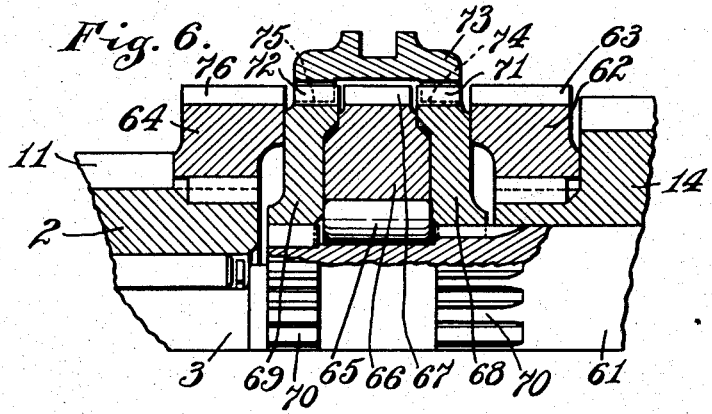
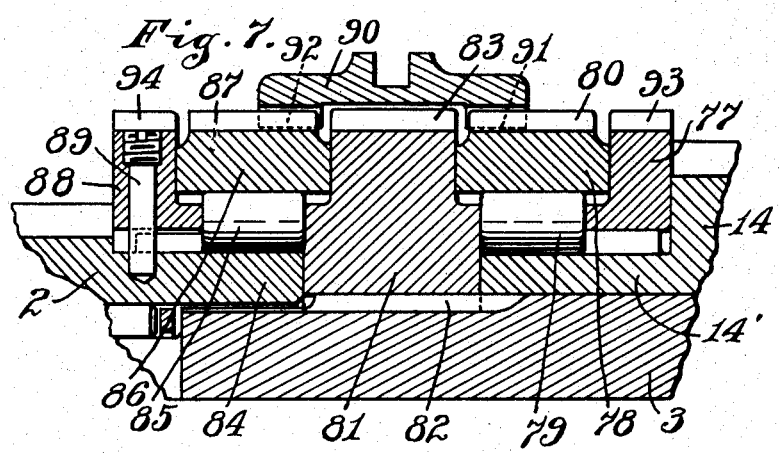
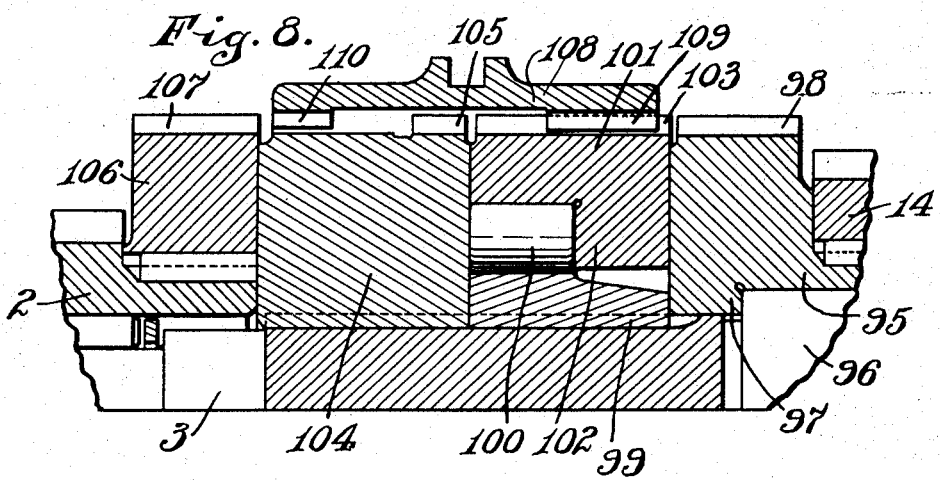
INVENTOR.
Henry H. Robbins,
BY
Hood + Hahn.
ATTORNEYS Patented Nov. 26, 1935

2,022,480

UNITED STATES PATENT OFFICE 2,022,480

FREEWHEELING MECHANISM

Henry H. Robbins, Muncie, Ind., assignor, by mesne assignments, to Borg-Warner Corporation, Chicago, Ill., a corporation of Illinois Application October 15, 1930, Serial No. 488,936

7 Claims. (Cl. 192—48)

My invention relates primarily to improvements in automobile transmissions and more particularly to that type of transmission which has become known commercially as the free-wheeling transmission wherein provision is made for the rotation of the driven shaft of the transmission independently of the driving shaft, in event the momentum of the automobile drives the driven shaft at a higher speed than that of the driving shaft.

It is one of the objects of my invention to provide a structure having the above characteristics, in which the shifting of the transmission may be made extremely simple and in which the member to be shifted may be extremely light as compared with the shiftable member of certain present transmissions having this characteristic.

For the purpose of disclosing my invention I have illustrated certain embodiments thereof in the accompanying drawings, in which:

Fig. 1 is a side elevation partially in section of a transmission embodying my invention;

Fig. 2 is a detailed sectional view of the freewheeling mechanism;

Fig. 3 is a transverse sectional view of the freewheeling clutch;

Fig. 4 is a longitudinal sectional view of a modified form of the free-wheeling mechanism;

Fig. 5 is a transverse sectional view of the freewheeling clutch shown in Fig. 4;

Fig. 6 is a longitudinal sectional view of another modification of the free-wheeling mechanism;

Fig. 7 is a longitudinal sectional view of a certain modification; and

Fig. 8 is a longitudinal sectional view of another modification of my invention.

In the structure illustrated in Figs. 1, 2, and 3 inclusive, I provide the usual transmission case 1, into which projects the driving shaft 2 and the driven shaft 3, the driven shaft being piloted in the driving shaft as at 4. In addition to the above shafts I provide a jack-shaft 5 on which is rotatably mounted a spindle 6 provided with the gears 7, 8, 9 and 10. The drive shaft 2 is provided with a driving gear 11 adapted to mesh with and drive the gear 7. The driven shaft 3 is splined as at 12 and has splined thereon a gear 13 axially movable on the shaft but rotatable therewith and adapted to be moved into mesh with the gear 9 for low speed drive and with an idler (not shown) meshing with the gear 10 for reverse drive.

In addition to the gear 13, on the driven shaft, I mount a gear 14 on the driven shaft, which gear is normally freely rotatable on the shaft. This gear is mounted on an unsplined portion 15 of the shaft and is held against axial displacement by a ring 16 secured to the end of the hub of the gear 14 and having a shoulder 17 overhanging a ring 18 secured on the shaft 3, which ring is set in an annular slot in the shaft to be held against axial displacement. The hub of the gear 14 is also provided with an annular ring 19' having exterior teeth 19 thereon and provided with internal teeth meshing with external teeth on the hub 14 to prevent relative rotation between the ring and the hub. This ring is also held against axial displacement by suitable means as screws or the like (not shown). Mounted on the portion 15 of the shaft 3 is a series of rollers 20, the rollers of each series gradually diminishing in size. Surrounding these rollers is the outer member 21 of an overrunning clutch, which member is provided on its inner face with a plurality of cam surfaces 22 having shoulders 23 against which abut coiled springs 24, biasing members 25 towards the lowest part of the cam and thereby biasing the series of rollers in the same direction. This outer member 21 is provided with a series of clutch teeth 26 adapted to be engaged by the internal clutch teeth 27 on the clutch ring 28, and it will be noted that intermediate the length of this clutch ring 28 the teeth 27 are higher as at 29. The purpose of this construction will appear more fully hereinafter. Arranged on each side of the outer member 21 of the over-running clutch is a pair of rings 30 and 31 provided respectively with clutch teeth 32 and 33. These rings are keyed to the shaft 15 by suitable key members 34 and are provided with annular hubs 35, extending beneath the outer member 21 and adapted to maintain the rollers 20 in position against axial displacement.

The drive shaft 2 is provided with a ring 36 having clutch teeth 37 and is locked to the shaft by means of internal teeth meshing with external teeth on the shaft.

In operation the driven shaft 3 is operated at low speed by shifting the gear 13 into mesh with the gear 9. If it be desired to drive the driven shaft 3 at second speed the clutch ring 28 is shifted until the teeth 27 engage with the teeth 19 of the gear 14. This connects the gear 14 to the shaft 3 through the overrunning clutch mechanism so that, in event the speed of the shaft 3 becomes greater than the speed of the shaft 2 the shaft 3 may operate independently of the shaft 2, although when the shaft 2 is driving the shaft 3 the two shafts are connected. If it be desired to lock out the overrunning clutch while driving at second speed the clutch ring 28 is moved further to the right, looking at Fig. 2, until the long teeth 29 mesh with the teeth 32 so that, in view of the fact that the teeth 27 are still in mesh with the teeth 19, the gear 14 is locked directly to the shaft to turn with the shaft in either direction and the overrunning clutch is locked out. If it be desired to operate the shaft 3 directly from shaft 2 and in "high", the clutch ring 28 is moved to the left looking at Fig. 2 until the teeth 27 mesh with the teeth 37 and the shaft 3 is driven by the shaft 2 through the overrunning clutch. A continued movement of the control ring 28 in the same direction will engage the high teeth 29 with teeth 33 thereby locking the shafts 3 and 2 together to drive the shaft 3 in either direction, thus locking out the overrunning clutch.

In the structure illustrated in Fig. 4, I have shown a modified arrangement of my invention wherein two overrunning clutches are provided, one for the second speed gear and the other for the third or high speed connection. In this structure the second speed gear 14 is locked on a hub 38 freely rotatable on a barrel portion 39 of the shaft 3. This hub has an inwardly extending annular flange 40 which overhangs the barrel portion 39 to prevent axial displacement of the hub in one direction. This hub is provided with clutch teeth 41, the purpose of which will appear more fully hereinafter. The gear 11 is provided with a ring 42 locked thereon by suitable keys 43 similar to the keys 44 for locking the gear 14 in position, and this ring is provided with clutch teeth 45. The overrunning clutch structure comprises two overrunning clutches, each one of which is of similar construction. A cam ring 46 is splined on the shaft 3 and this cam ring is provided with a plurality of cam surfaces 47 on which operates a series of cam rollers 48, the rollers of each series gradually diminishing in diameter. Surrounding the rollers is an outer clutch ring 49 provided with peripheral clutch teeth 50. A second cam ring 51 having similar rollers 52 is mounted on the shaft 3 and this ring and the rollers are surrounded by a clutch ring 53 provided with radial teeth 54. Interposed between these two overrunning clutches is a toothed ring 55 splined on the shaft 3 and provided with radial clutch teeth 56. This structure comprising the two overrunning clutches and the ring 55, it will be noted is held against axial displacement between the toothed ring 42 and the hub 38. A clutch ring 57 surrounds the two overrunning clutch members and is provided with two sets of clutch teeth 58 and 59. This ring is provided with an annular groove 60 by which it may be shifted in one direction or the other by means of the ordinary shifter fork of the transmission shifting mechanism. When the clutch ring 57 is shifted to the right until the teeth 58 mesh with the teeth 41, the teeth 59 being still in mesh with the teeth 54, the gear 14 is connected to the driven shaft 3 through the overrunning clutch including the clutch members 51 and 53. If the clutch member 57 is shifted further to the right with the teeth 58 still in engagement with the teeth 41 but with the teeth 59 meshing with the teeth 56 the gear 14 will be connected to the shaft 3 for driving in either direction and the over-running clutch will be locked out.

If on the other hand the clutch member 57 is shifted to the left meshing teeth 59 with the teeth 45, the shafts 2 and 3 will be directly connected together through the overrunning clutch, including the members 46 and 49. If, however, the ring is shifted further to the left until the teeth 58 engage the teeth 56, the overdunning clutch 58 will be locked out and the shafts 2 and 3 connected for drive in either direction.

In the structure illustrated in Fig. 6, I have shown a further modification of my invention. In this structure the gear 14 is freely rotatable on the barrel portion 61 of the shaft 3 and is provided with a toothed ring 62. This ring is provided with internal teeth meshing with external teeth on the hub of the gear 14 for locking the ring and gear against relative rotation and is provided with external teeth 63. A similar clutch ring 64 is mounted on the shaft 2. Overrunning clutch rollers 65 are interposed between the shaft 3 and an overrunning clutch ring 66. The ring 66 is of substantially the same construction, so far as the overrunning clutch arrangement is shown, as that shown in Fig. 3, and is provided with clutch teeth 67. Arranged on either side of the ring 66 are lock out rings 68 and 69, having internal splines meshing with splined portions 70 on the shaft 3 to prevent relative rotation between the rings and the shaft and the ring 68 is provided with clutch teeth 71, while the ring 69 is provided with similar clutch teeth 72. Surrounding this portion is a clutch ring 73 having teeth 74 adapted to engage with the teeth 71 and teeth 75 adapted to engage with the teeth 72. In this structure the parts are locked up against axial displacement between the rings 62 and 64, the ring 62 being prevented from axial displacement in one direction by the hub of the gear 14 and being held against axial displacement in the opposite direction by the teeth 11 on the shaft 2.

In this structure when the clutch ring 73 is shifted to the right, teeth 75 mesh with teeth 67 and teeth 74 mesh with teeth 63 thereby connecting the gear 14 to the shaft 3 through the overrunning clutch. A further shift to the right meshes teeth 75 with the teeth 71 so that the gear 14 is connected to the shaft 3 through the lock out ring 68 whereby the gear will rotate with the shaft in either direction. A shift to the left meshing teeth 75 with the teeth 76 on the ring 64 directly connects the shafts 2 and 3 together through the overrunning clutch. A further shift to the left meshes teeth 74 with the teeth 72 of the lock out ring 69 thereby connecting the shafts 2 and 3 together for drive in either direction.

In Fig. 7 I have illustrated another modification of my invention and in this structure the gear wheel 14 is provided with an extended sleeve 14', the gear and sleeve being freely rotatable on the shaft 3. A ring 77 is mounted on this sleeve, having a series of teeth intermeshing with teeth on the sleeve to prevent relative rotation between the two. This sleeve forms one member of an overrunning clutch. The opposite and outer member 78 of this clutch has its inner surfaces cammed as is the outer member 21 of the clutch shown in Fig. 3 and interposed between sleeve and this outer member 78 are suitable overrunning clutch rollers 79. This outer member is provided with teeth 80. A lock out ring 81 is secured on the shaft 3 by suitable splines 82 and this ring is provided with teeth 83. The end of the shaft 2 is extended to form the inner member 84 of an overrunning clutch having mounted thereon overrunning clutch rollers 85, which are surrounded by an outer overrunning clutch member 86 of the same construction as the member 78. This outer member is likewise provided with teeth 87. The shaft 2 also is provided with a ring 88 secured thereon, against rotation by suitable teeth intermeshing with teeth on the shaft 2 and held against axial displacement by locking pins 89. It will be noted that in this structure, like the other structures heretofore described, the various parts of the overrunning clutch assembly are held against axial displacement between axially stationary parts on the shafts 2 and 3. Surrounding the overrunning clutch assembly is a clutch ring 90 having internal clutch teeth 91 and 92 at its respective ends.

In operation when the clutch member 90 is shifted to the right to engage the teeth 92 with the teeth 83, the gear 14 is connected to the shaft 3 through the overrunning clutch including the outer member 78. A further shift to the right of the clutch member 90 meshes teeth 91 with the teeth 93 on the ring 77 locking out the overrunning clutch and connecting the gear 14 to the shaft 3 for a drive in either direction. A similar shift of the clutch ring 90, from neutral, to the left first meshes teeth 91 with teeth 83, teeth 92 being already in mesh with teeth 87, thereby obtaining a direct drive of the shaft 3 from the shaft 2 through the overrunning clutch including the clutch member 86. A continued shift to the left meshes teeth 92 with the teeth 94 of the ring 88 thereby locking out the overrunning clutch and connecting the shafts 2 and 3 together for a drive in either direction.

A further modification of my invention is illustrated in Fig. 8. In this structure the gear 14 is mounted on a freely rotatable hub 95 mounted on a barrel portion 96 of the shaft 3. This hub is provided with an inwardly extending annular flange 97 which overhangs the barrel portion 96 holding the hub 95 against axial displacement in one direction. The hub 95 is provided with peripheral teeth 98. The inner member 99 of an overrunning clutch is splined on the shaft 3 and this inner member is provided with cam surfaces like the inner member 46 of the clutch structure illustrated in Fig. 5. Clutch rollers 100 are arranged on this inner member and these clutch rollers are surrounded by an outer clutch member 101, which is provided with an inwardly extending flange 102 overhanging the ends of the rollers to prevent axial displacement thereof in one direction. This outer clutch member is provided with teeth 103. A ring 104 is also splined on the shaft 3 and is provided with clutch teeth 105. The shaft 2 at its end is provided with a ring 106 having internal teeth interlocking with teeth on the shaft 2 to prevent relative rotation between the two, and this ring is provided with teeth 107. A clutching ring 108 surrounds the parts described, and this ring is provided with internal teeth 109 at one end and with a set of internal teeth 110 at the opposite end.

In the operation of this structure when the clutch ring 108 is moved to the right until the teeth 109 bridge the teeth 103 and 98 the gear 14 is connected to the shaft 3 through the overrunning clutch. A further movement of the clutch ring 108 to the right meshes teeth 110 with teeth 105 and moves teeth 109 out of engagement with teeth 103 but still in engagement with teeth 98. Under these circumstances the gear 14 is connected to the shaft through the ring 104, locking out the overrunning clutch and connecting the gear 14 to the shaft for a drive in either direction. A shift of the clutch ring 108 to the left meshes teeth 110 with 107 leaving teeth 109 to mesh with 103. This connects the shafts 2 and 3 directly through the overrunning clutch. A continued shift to the left causes teeth 109 to bridge teeth 103 and 105, leaving teeth 110 still meshing with teeth 107 and this arrangement locks out the overrunning clutch, permitting a direct drive between shafts 2 and 3 in either direction.

I claim as my invention:

1. In a transmission including speed changing gears, the combination with a driving member and a driven member, of an overrunning clutch including an inner member and an outer member, one of said members having cam surfaces and wedging members interposed between said inner and outer members, and means axially shiftable independently of said overrunning clutch and any of the speed changing gears for coupling said driving and driven members together through said overrunning clutch, said means being also operable to connect said driving and driven members together independently of said overrunning clutch.

2. In a transmission including speed changing gears, the combination with a driving member and a driven member, of an overrunning clutch including an inner member and an outer member, one of said members having cam surfaces and wedging members interposed between said inner and outer members, and means axially shiftable independently of said overrunning clutch and any of the speed changing gears for coupling said driving and driven members together through said overrunning clutch, said means being also operable by a continued axial movement in the same direction to connect said driving and driven members together independently of said overrunning clutch.

3. In a transmission including speed changing gears, the combination with a driving member and a driven member, of an overrunning clutch surrounding said driven member and including an inner member and an outer member, one of said members having cam surfaces and wedging members interposed between said inner and outer members, and means axially shiftable independently of said overrunning clutch and any of the speed changing gears for coupling said driving and driven members together through said overrunning clutch, said means being also operable to connect said driving and driven members together independently of said overrunning clutch.

4. In a transmission including speed changing gears, the combination with a driving member and a driven member, of an overrunning clutch including an inner clutch member and an outer clutch member, one of said members having cam surfaces, wedging members interposed between said clutch members, peripheral clutch teeth on said outer clutch member, peripheral clutch teeth on one of said driving and driven members, a second set of peripheral teeth on one of said driving and driven members, and a clutch member axially shiftable independently of said overrunning clutch and any of said speed changing gears having internal clutch teeth engaging with the clutch teeth on the outer member of the overrunning clutch and the first set of clutch teeth on one of said driving and driven members for connecting the same together through said overrunning clutch and engaging the first set of clutch teeth on one of the driving and driven members and the second set of clutch teeth on one of the driving and driven members for connecting said members together independently of said overrunning clutch.

5. The combination with a driving shaft and a driven shaft, of a gear forming one of a gear train for driving said driven shaft from said driving shaft, said gear being rotatably mounted on the driven shaft and axially fixed thereon, a clutch member axially and rotatably fixed on said driving shaft, an overrunning clutch including an inner member and an outer member, one of said members having cam surfaces and wedging members interposed between said outer and inner members, said outer clutch member and wedging members being held against axial displacement by said gear and clutch member on the driving shaft, and an axially shiftable clutch member shiftable independently of said overrunning clutch for coupling said driving and driven shafts together through said overrunning clutch, said clutch member being also operable to connect said shafts together independently of said overrunning clutch.

6. The combination with a driving member and a driven member of an overrunning clutch interposed between said members including an inner clutch member and an outer clutch member, cam surfaces on one of said members and wedging members interposed between the inner and outer clutch members, peripheral clutch teeth on the outer overrunning clutch member, peripheral clutch teeth on one of said driving and driven members, a locking ring on said driven member having peripheral clutch teeth, and an axially movable clutch member having sets of internal teeth for engagement with the teeth of the overrunning clutch member and the teeth of the driving member to connect the driving and driven members through said overrunning clutch or with the teeth of the locking ring and the teeth on the driving member for connecting said driving and driven members independently of said overrunning clutch.

7. In a transmission including speed-changing gears, the combination with a driving member and a driven member, of an axially-stationary overrunning clutch including an inner clutch member and an outer clutch member surrounding the inner clutch member, one of said clutch members being connected to the driven member and one of said clutch members having cam surfaces, wedging members interposed between said clutch members, clutch teeth on the periphery of the outer clutch member, a locking member connected to the driven member, peripheral clutch teeth on the locking member, clutch teet on the driving member, and an axially-shiftable clutch ring shiftable independently of said overrunning clutch and any of said speed-changing gears and having internal clutch teeth adapted to engage the teeth on the driving member and the teeth on the outer overrunning clutch member for connecting the driving and driven members through said overrunning clutch, or to engage the clutch teeth on the driving member and the teeth on the locking ring to connect the driving and driven members independently of the overrunning clutch.

HENRY H. ROBBINS.